Figure 1:
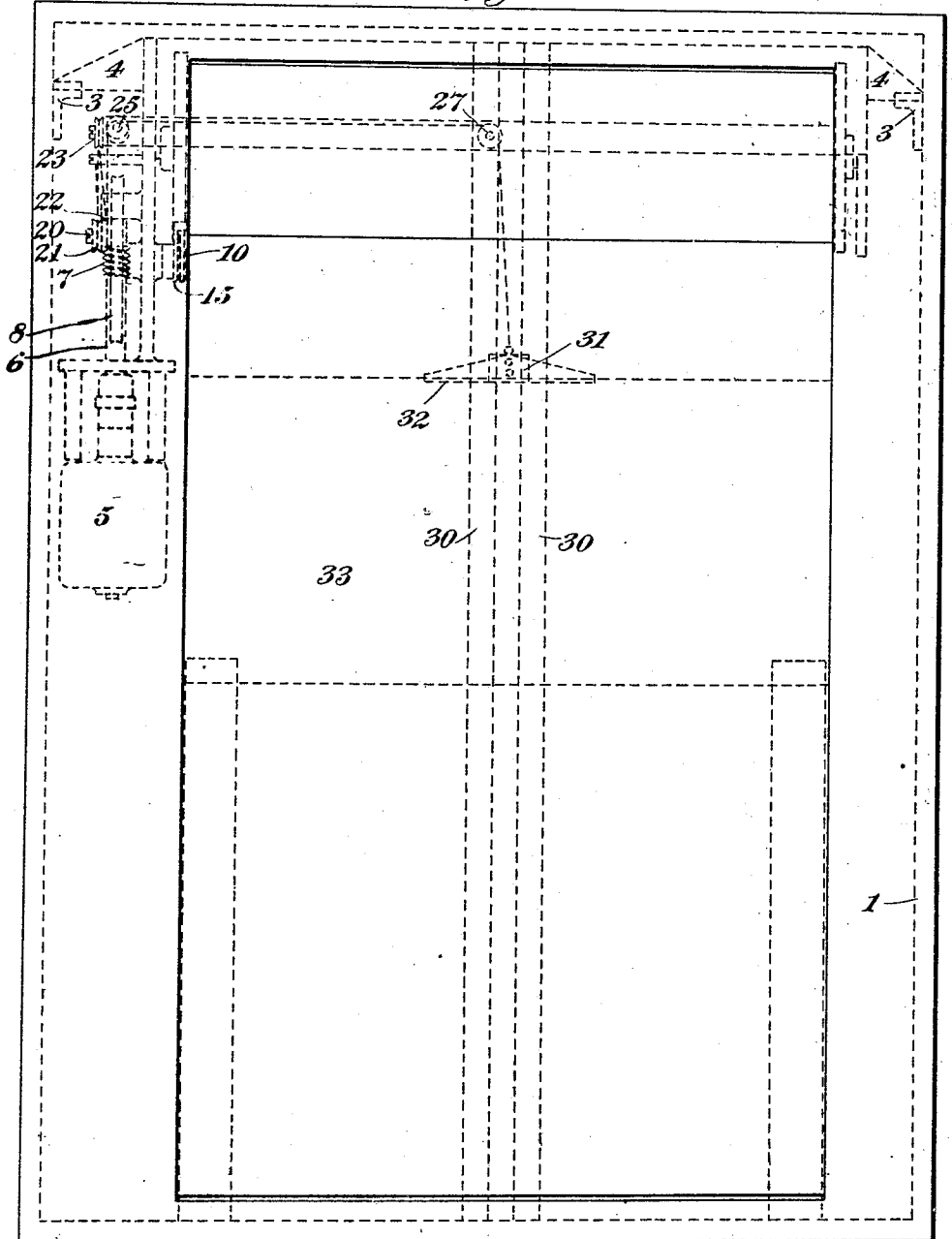

May 26, 1925.

L. R. McDONALD

DISPLAY APPARATUS

Filed March 20, 1924

1,539,682

5 Sheets-Sheet 1

Inventor

Leslie R. McDonald.

By his Attorney

Andrew Wilson.

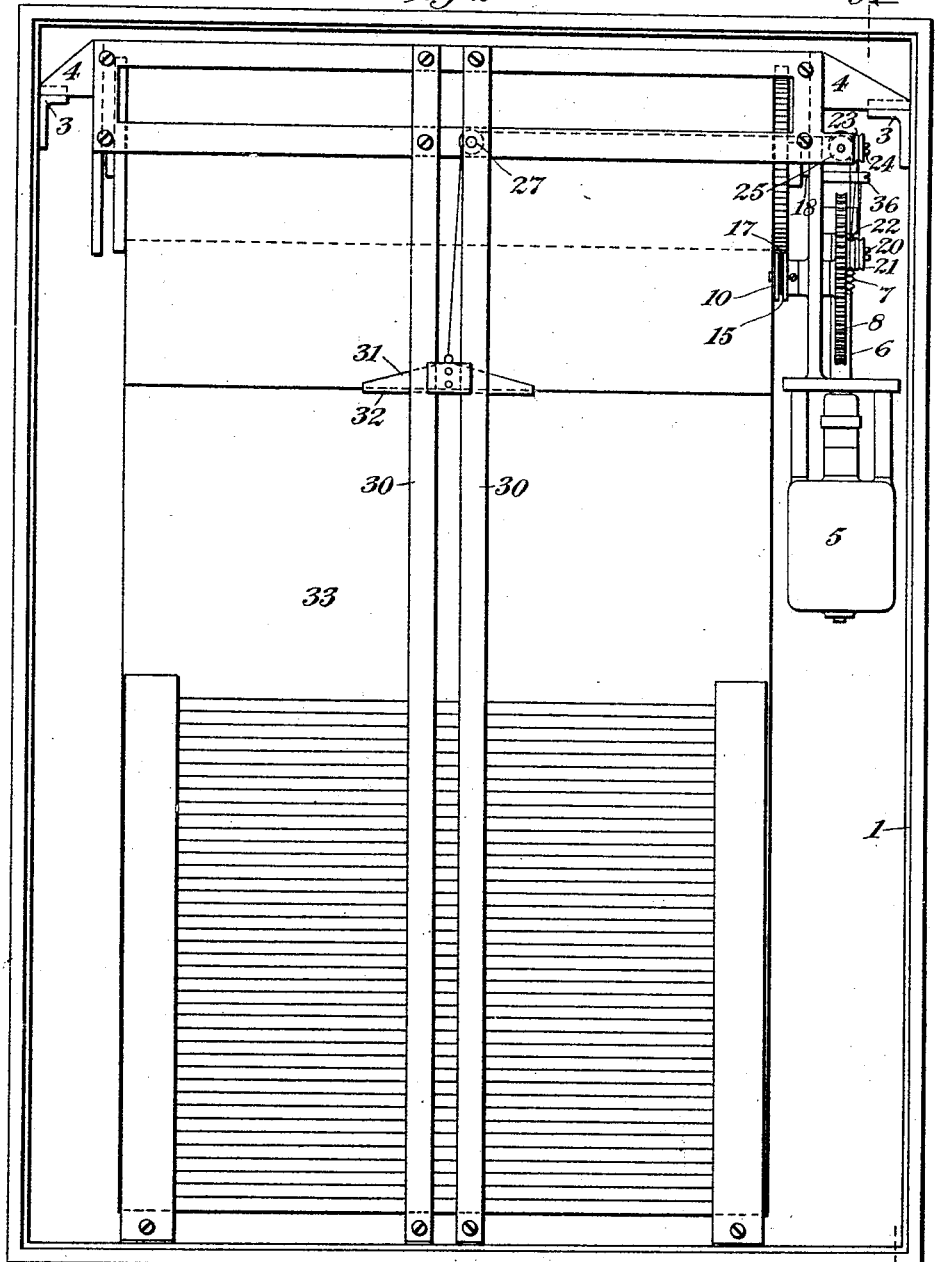

May 26, 1925.
L. R. McDONALD
DISPLAY APPARATUS
Filed March 20, 1924 5 Sheets-Sheet 3
1,539,682
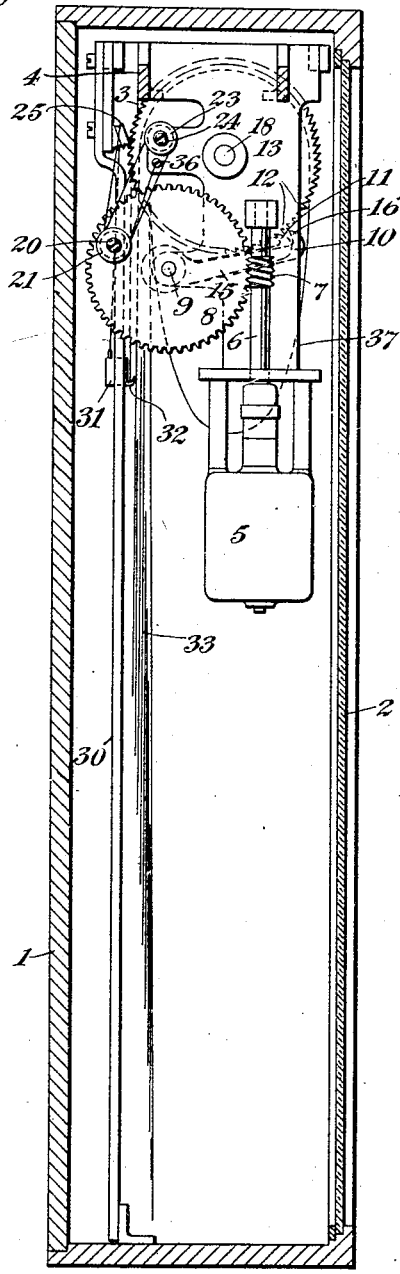
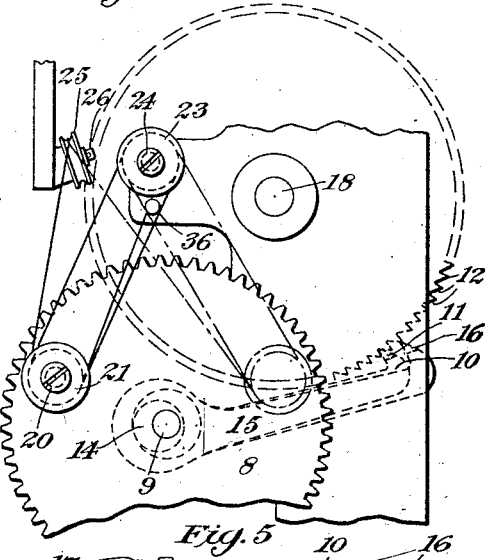
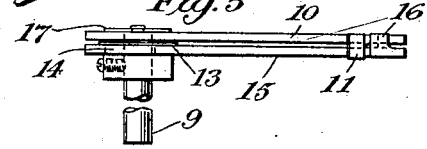
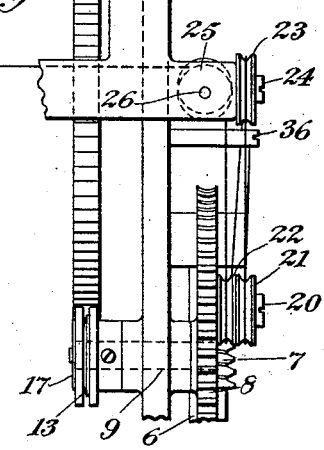
Inventor,
Leslie R. McDonald.
By his Attorney
Andrew Wilson.

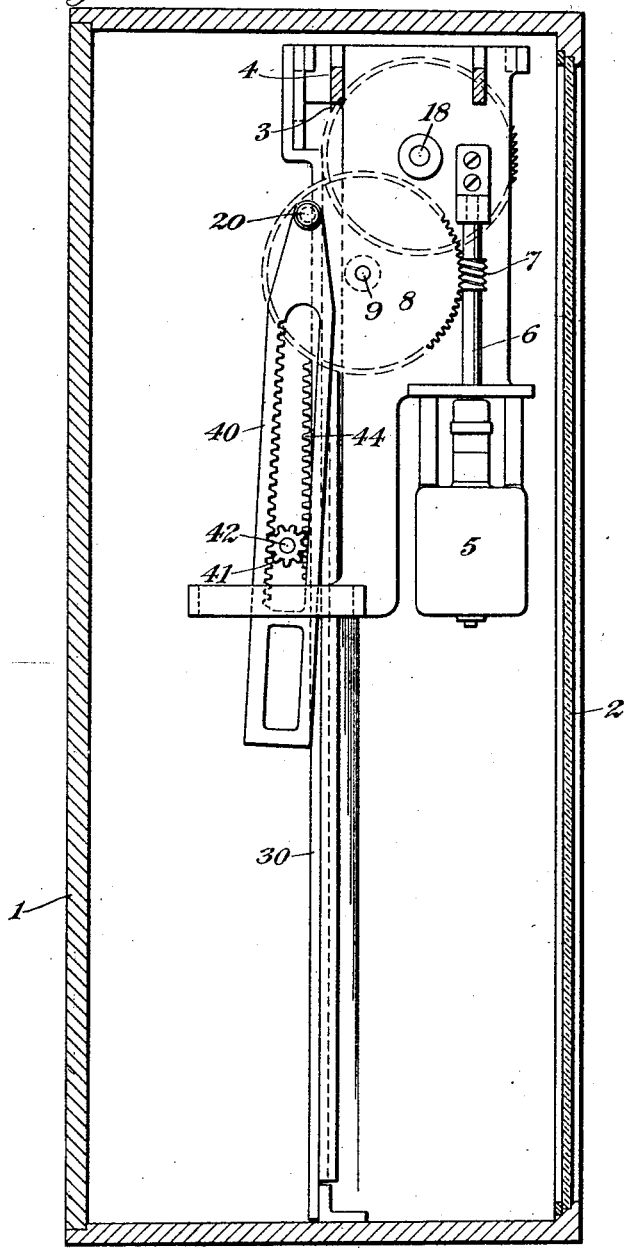

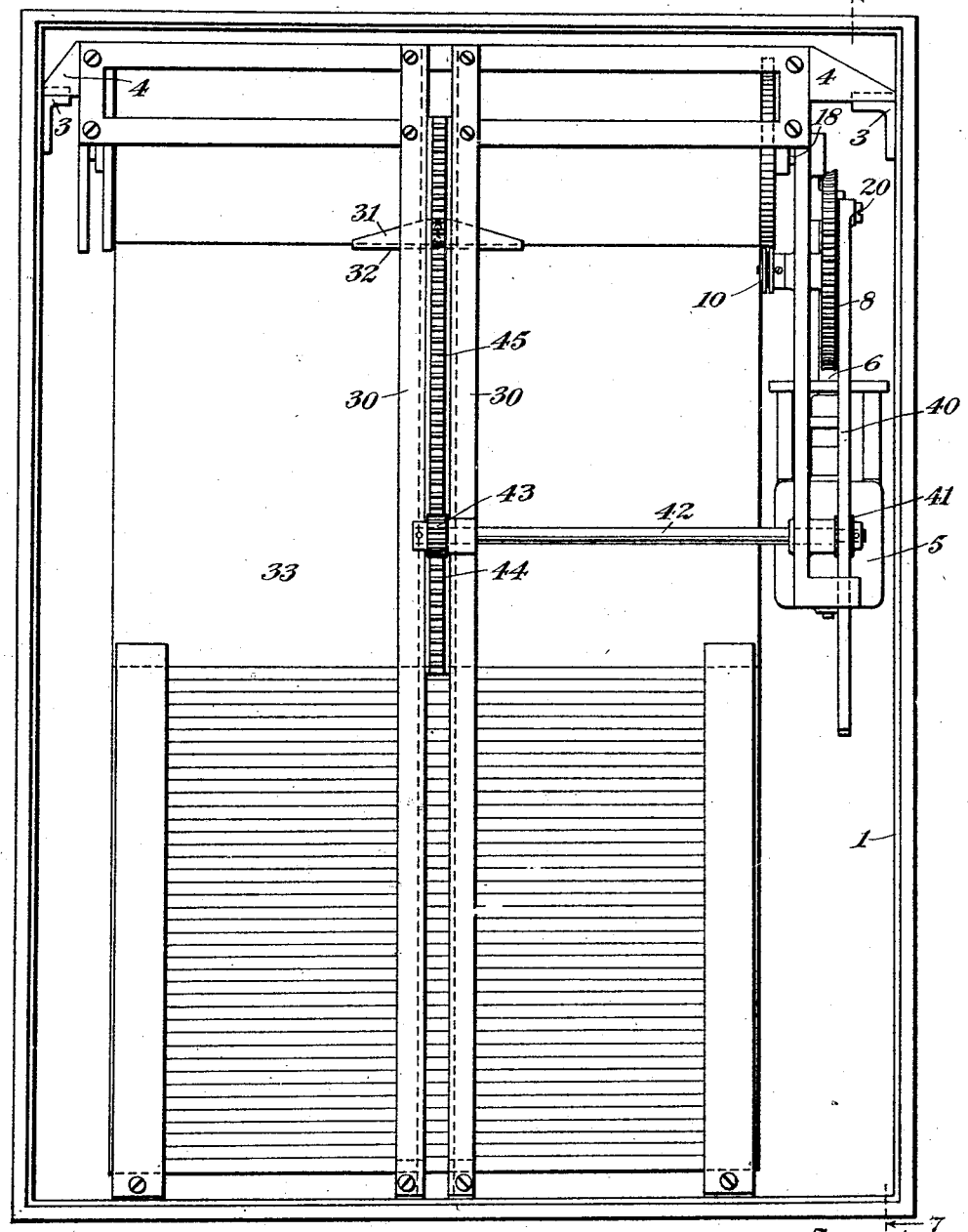

Patented May 26, 1925.

1,539,682

UNITED STATES PATENT OFFICE.

LESLIE R. McDONALD, OF MONTREAL, QUEBEC, CANADA.

DISPLAY APPARATUS.

Application filed March 20, 1924. Serial No. 700,536.

*To all whom it may concern:*

Be it known that I, LESLIE R. McDONALD, a citizen of the United States, residing at Montreal, Quebec, Canada, have invented certain new and useful Improvements in Display Apparatus, of which the following is a specification.

My invention relates to that class of display apparatuses wherein flexible placards are wound around a rotatable holder and are released and allowed to unroll one by one and successively drop into view position; and my improvements are particularly directed to means whereby placards may be exhibited, upon such apparatuses, which are of much greater length than any that it has been practicable to use heretofore.

In such apparatuses it has been customary to wind the whole placard around the revolving carrier so that the free ends of the placards will rest upon the roll of placards, and will be released one by one, allowing them to unroll and drop forward and down. The length of the placards used, therefore, has been limited by the circumference of the revolving carrier; and, in practice, it has been necessary to restrict the diameter of the carrier in order to economize space in the exhibiting apparatus.

In my improved apparatus I avoid the drawbacks of previous constructions, by letting the free ends of the placards hang down a considerable distance behind the rotating carrier, and by providing mechanism which will raise the free ends one by one so as to permit the placard to unroll and drop forward and down from the carrier, thereby increasing the length of the placards which may be used to the extent by which they hang down behind the carrier.

In the drawings, Fig. 1 is a front elevation of an apparatus embodying my improvements; Fig. 2 is a rear view of the same, the back of the casing being removed; Fig. 3 is a side view looking to the left on Fig. 2, taken on the line 3—3 of Fig. 2, the casing being in section; Fig. 4 is a detail, on an enlarged scale, of part of the operating mechanism, taken from the same point of view as Fig. 3; Fig. 5 is a view of part of the same mechanism, taken as looking up on Fig. 4; Fig. 6 is a detail of the same, taken as looking to the right on Fig. 4; Fig. 7 is a side view and Fig. 8 is a back view, illustrating a modified form of the operating mechanism.

In all the figures similar parts are designated by similar reference numerals.

The apparatus is preferably inclosed in a suitable casing 1, having an open or glazed front 2; and is preferably provided with suitable supports, such as the brackets 3—3, upon which a framework 4—4 may be supported for carrying the operating mechanism, which, in the form illustrated, includes driving means such as an electric motor 5, the shaft 6 of which is provided with worm 7 meshing with a worm gear 8, fixed to a shaft 9 upon the inner end of which is frictionally journalled a pawl arm 10, the detent 11 of which engages with the teeth 12—12 on the disk 13 and is normally pressed up against the same by the rotation of the shaft 9. The shaft 9 also carries an eccentric 14 upon which is mounted the feeding pawl 15 which is reciprocated by the rotation of the eccentric, so that its detent 16 will engage with the teeth 12—12 and turn the disk 13 one step for each revolution of the shaft 9. The detent 11 extends over the arm 15, which acts as a keeper and prevents it from dropping out of operative position if the frictional resistance produced by the spring washer 17 is insufficient to hold the arm to duty.

The disk 13 is mounted on a shaft 18 on which is mounted the placard carrying means. Any suitable form of placard carrier, and of means for attaching the placards to the carrier, may be employed. A suitable type of such apparatus is illustrated in my Letters Patent No. 1,477,887 of December 18th, 1923. Shaft 18 corresponds to shaft 22 of that patent, to which notched disks 5 and 6 are fixed, cross bars 9, 9, on the ends of the placards being held in the notches by disks 3 and 4, the flanges of which overlap the ends of the bars. This assemblage constitutes a carrier reel to which the placards are detachably attached, and around which they are wound as the shaft 18 turns.

The worm gear 8 carries a wrist pin 20, on which two pulleys 21 and 22 are mounted; while another pulley 23 is mounted upon a pivot 24 fixed to the frame 4; and still another pulley 25 is mounted upon a pivot 26, also fixed to the frame 4.

The frame 4 also has a pulley 27 pivoted to a cross bar on the frame.

Parallel tracks 30—30 are fastened to the back of the machine, and act as guides for a cross head 31, which is provided with an inwardly and upwardly turned flange 32, adapted to press from behind against the hanging portions of the placards 33.

One end of a cord 35 is fastened as at 36 to the frame A and is carried down around the pulley 21, up over the pulley 23, down around the pulley 22, up over the pulley 25, over the pulley 27 and down to the cross head 31, to which the other end of the cord is attached.

When, therefore, the motor 5 turns the disk 8 one revolution, the placard carrier will be moved one step, and during this movement the wrist pin 20 will be carried around so as to increase and then diminish the distance between it and the pivot 24, thereby increasing and diminishing the length of cord stretched between the pulleys 21, 22 and 23, and consequently raising and lowering the cross head 31.

With the parts in the position shown in Fig. 3, this movement, which is clockwise, of the wrist pin will first allow the cross head 31 to drop far enough for its flanged edge 32 to pass below the lower end of the rearmost placard 33. Then when the cross head begins to rise again, the flange 32 will catch under the lower end of the rear placard and will lift it upward, allowing the body of the placard to slide forward over the carrier as indicated by the broken line 37 in Fig. 3. The upward travel of the cross head 31 extends sufficiently far to insure the end of the placard being raised to a point where it will be pulled forward over the carrier by the weight of the placard itself, and will drop down into view position beneath the carrier.

During this operation the placard carrier has been rotated one step so that the hanging end of the next placard 33 will be in proper position to be engaged by the flange of the cross head when the cross head is dropped to its lowest point by the next rotation of the wrist pin 20.

In Figs. 7 and 8 I have shown a modification wherein the cords and pulleys are omitted, and instead a rack bar 40 is mounted on the wrist pin 20 and is made to mesh with the pinion 41 on a shaft 42 mounted in the frame of the machine and carrying a pinion 43 meshing with a rack bar 44 attached to an extension 45 carried by the cross head 31.

In this modification, therefore, the shaft 42 is turned in one direction and then in the other by the rotation of the wrist pin 20, and causes the pinion 43 to raise and lower the rack bar 44, and thereby to reciprocate the cross head 31 so as to engage and lift the end of the rearmost placard, and in the same way as though it was raised and lowered by means of the cord and pulleys.

It will be understood, also, that the mechanism may be modified in other details of construction, as by the use of mechanical equivalents, without departing from the spirit of my invention as claimed.

Having thus described my invention, what I claim and desire to secure by Letters Patent of the United States is:—

1. In a display apparatus, the combination of rotating means and a rotatable placard carrier, a series of flexible placards each attached by one end thereto and partially rolled thereupon with their free ends depending therefrom, and means for engaging and lifting the free end of a placard.

2. In a display apparatus, the combination of rotating means and a rotatable placard carrier, a series of flexible placards each attached by one end thereto and partially rolled thereupon with their free ends depending therefrom, and means for engaging and lifting the free end of each placard successively.

3. In a display apparatus, the combination of rotating means and a rotatable placard carrier, a series of flexible placards each attached by one end thereto and partially rolled thereupon with their free ends depending therefrom, and reciprocating means for engaging and lifting the free end of a placard.

4. In a display apparatus, the combination of rotating means and a rotatable placard carrier, a series of flexible placards each attached by one end thereto and partially rolled thereupon with their free ends depending therefrom, and means for engaging and lifting the free end of a placard to a point where the weight of the placard will pull it forward over the carrier.

5. In a display apparatus, the combination of rotating means and a rotatable placard carrier, a series of flexible placards each of materially greater length than the circumference of the carrier attached by one end thereto and partially rolled thereupon, and means for causing the placards to successively fall forward over the carrier and to unroll to substantially full length.

6. In a display apparatus, the combination of a rotatable placard carrier, rotating means, a series of flexible placards each substantially longer than the circumference of the carrier secured thereto by one end and partially rolled thereupon, placard lifting means embracing a lifter, a flexible element and pulleys and means for actuating the lifting means.

7. In a display apparatus, the combination of a rotatable placard carrier, rotating means, a series of flexible placards each substantially longer than the circumference of the carrier secured thereto by one end and partially rolled thereupon, and placard lifting means embracing a lifter, a flexible element and a rotatable element carrying pulleys.

8. In a display apparatus, the combination of a rotatable placard carrier, rotating means, a series of flexible placards each substantially longer than the circumference of the carrier secured thereto by one end and partially rolled thereupon, and placard lifting means embracing a lifter, a flexible element traveling over pulleys having fixed positions and other pulleys having a relatively moveable position.

9. In a display apparatus, the combination of a rotatable placard carrier, rotating means, a series of flexible placards each substantially longer than the circumference of the carrier secured thereto by one end and partially rolled thereupon, and placard lifting means embracing a lifter, a flexible element traveling over pulleys having fixed positions and other pulleys having a relatively moveable position and means for changing the relative positions of the fixed and moveable pulleys.

10. In a display apparatus, the combination of a rotatable placard carrier, rotating means, a series of flexible placards each substantially longer than the circumference of the carrier secured thereto by one end and partially rolled thereupon and placard lifting means embracing a rotating element carrying pulleys mounted thereupon, guide pulleys, a flexible element, and a lifter attached thereto.

LESLIE R. McDONALD.